United States Patent
Kazmi

(10) Patent No.: US 9,113,423 B2
(45) Date of Patent: Aug. 18, 2015

(54) METHODS AND DEVICES FOR INTERFERENCE CONTROL IN HOME BASE STATION ENVIRONMENTS

(75) Inventor: Muhammad Kazmi, Bromma (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 748 days.

(21) Appl. No.: 13/010,989

(22) Filed: Jan. 21, 2011

(65) Prior Publication Data

US 2011/0201377 A1 Aug. 18, 2011

Related U.S. Application Data

(63) Continuation of application No. PCT/SE2011/050055, filed on Jan. 19, 2011.

(60) Provisional application No. 61/304,968, filed on Feb. 16, 2010.

(51) Int. Cl.
*H04W 52/04* (2009.01)
*H04W 52/24* (2009.01)

(52) U.S. Cl.
CPC .................................. *H04W 52/244* (2013.01)

(58) Field of Classification Search
CPC .......................... H04W 52/367; H04W 52/146
USPC .......................................... 455/522; 370/318
See application file for complete search history.

(56) References Cited

U.S. PATENT DOCUMENTS 6,035,209 A 3/2000 Tiedemann, Jr. et al.
7,230,568 B2 * 6/2007 Rao et al. .................. 342/357.68

(Continued)

FOREIGN PATENT DOCUMENTS

| WO | 0033478 A1 | 6/2000 |
|---|---|---|
| WO | 2008093100 A2 | 8/2008 |
| WO | 2009119212 A1 | 10/2009 |
| WO | 2010036180 A1 | 4/2010 |

*Primary Examiner* — Bobbak Safaipour
(74) *Attorney, Agent, or Firm* — Coats & Bennett, P.L.L.C.

(57) ABSTRACT

In methods and devices GNSS reception quality can be used to determine the maximum output power of a Home UE, i.e. a UE served by home base station and is based on the insight that GNSS reception quality may be used for estimation of the interference caused by transmissions of an HUE on an existing network. The power of the HUE need be restricted to keep interference within limit. The estimation of the interference, and the determination of the HUE maximum output power, is based on the GNSS reception quality in the HUE, or the GNSS reception quality in the HBS or on a combination of the GNSS reception in the HUE and the HBS. In one embodiment a combined metric based on the GNSS reception quality and one or more cellular radio measurement is used to determine the maximum output power of the HUE. The GNSS reception quality measurements and the cellular measurements used for deriving the combined metric can be performed in the HUE and/or in the HBS or in both. Hereby a number of advantages over current systems and methods can be achieved. For example, the interference from the HUE (served by the home BS) to other cellular network e.g. macro network or relay nodes is reduced. The GNSS or A-GNSS receiver in the UE and/or home BS are exploited for setting an appropriate maximum output power of the HUE. The HUE served by the home BS is able to operate at its maximum possible output power level whenever possible without significantly generating interference towards the surrounding network.

24 Claims, 4 Drawing Sheets

(56) References Cited

U.S. PATENT DOCUMENTS

| | | | |
|---|---|---|---|
| 7,328,104 B2* | 2/2008 | Overstreet et al. | 701/472 |
| 7,667,642 B1* | 2/2010 | Frericks et al. | 342/357.57 |
| 8,095,091 B1* | 1/2012 | Kopikare | 455/127.1 |
| 8,249,641 B1* | 8/2012 | Khanka et al. | 455/522 |
| 8,531,333 B2* | 9/2013 | Leclercq et al. | 342/357.74 |
| 2008/0267150 A1 | 10/2008 | Rofougaran | |
| 2009/0258601 A1* | 10/2009 | Jauh | 455/67.13 |
| 2010/0273426 A1* | 10/2010 | Walley et al. | 455/63.1 |
| 2010/0296499 A1* | 11/2010 | Karaoguz et al. | 370/338 |
| 2011/0003557 A1 | 1/2011 | Morita et al. | |
| 2011/0019639 A1* | 1/2011 | Karaoguz et al. | 370/331 |
| 2011/0309976 A1* | 12/2011 | Leclercq et al. | 342/357.25 |
| 2012/0069766 A1* | 3/2012 | Fu et al. | 370/252 |
| 2012/0176923 A1* | 7/2012 | Hsu et al. | 370/252 |
| 2012/0257497 A1* | 10/2012 | Yoshimoto et al. | 370/230 |

* cited by examiner

METHODS AND DEVICES FOR INTERFERENCE CONTROL IN HOME BASE STATION ENVIRONMENTS

BACKGROUND

The radio and performance requirements and the necessary signaling to support the operation of a Wideband Code Division Multiple Access (WCDMA) home base station (BS) were successfully completed in Third Generation Partnership Project (3GPP) release 8. The corresponding home BS requirements are specified in 3GPP Technical Specification (TS) 25.104. The WCDMA home BS is also interchangeably termed as home NodeB(HNB) or more specifically frequency division duplex (FDD) HNB. The home BS requirements have also been specified for universal terrestrial radio access (UTRA) time division duplex (TDD) (i.e. TDD HNB), see 3GPP TS 25.105, "Base Station (BS) radio transmission and reception (TDD)"

The radio and performance requirements for the evolved UTRA (E-UTRA) home BS have also been standardized in release 9. There were two main variants of the E-UTRA home BS standardization work: Long Term Evolution (LTE) FDD Home eNode B (FDD HeNB) described in 3GPP Technical Report (TR) 36.921, "Evolved Universal Terrestrial Radio Access (E-UTRA); FDD Home eNodeB (HeNB) Radio Frequency (RF) requirements" and LTE TDD Home eNode B (TDD HeNB) described in 3GPP TR 36.922, "Evolved Universal Terrestrial Radio Access (E-UTRA); LTE TDD Home eNodeB RF Requirements".

Home base stations (HBS) are already operational in other technologies such as Global System for Mobile communication (GSM) and 3GPP2 CDMA technologies (e.g. CDMA2000 1xRTT and HRPD).

Home base stations (e.g. FDD/TDD HNB, TDD/FDD HeNB, GSM HBS, CDMA2000 1x HBS, HRPD HBS etc) are intended to be deployed in home or other private premises such as office or corporate environment. A large building may house several tens or even hundreds of home base stations. Hence a large number of users can be served by a home base station in a large building environment. An operator may choose to share the same carrier between home base stations and macro/mico/pico base stations (i.e. non home base stations covering larger areas than a home base station) or alternatively assign a dedicated carrier only for home base stations. Particularly, in the former scenario the users served by the home base station may also generate significant interference towards the macro/micro/pico base stations or relay nodes. Therefore the transmit power of a User Equipment (UE) served by the home base station needs to be properly regulated.

The terms femto base station, home base station, home Node B or home eNode B refer to the same type of base station in principle. For simplicity and consistency the term home base station (HBS) will be used in the rest of this application.

The following sections describe various concepts and technological aspects, which are used or are related to the present description.

Home Base Station

In existing Universal Mobile Telecommunications System (UMTS) Terrestrial Radio Access Network (UTRAN) specifications, three classes of base stations are defined:
Wide area BS, serving macro cell deployment;
Medium range BS, serving micro cell deployment; and
Local area BS, serving pico cell deployment.

In E-UTRAN specifications, two classes of base stations are defined:
Wide area BS, serving macro cell deployment; and
Local area BS, serving pico cell deployment.
In the E-UTRAN, the wide area BS is also called as the general purpose BS.

Home base stations are being developed to serve even smaller and more localized areas than the pico cells. Home base stations operate under licensed frequency band and for LTE FDD and TDD they are currently under standardization within 3GPP. For UTRAN FDD and TDD, the HBS requirements are already specified.

In WCDMA, the home base station maximum output power is limited to 20 dBm for the non multiple input multiple output (MIMO) case or 17 dBm per antenna port in case of MIMO (2×2). Same power level is also agreed to be specified for HBS in LTE FDD and TDD.

In general these different base station classes differ due to different minimum coupling loss in different environments. Secondly they typically operate at different maximum output power levels. For instance wide area BS operates at higher maximum output power than the medium range and so on. These factors in turn lead to different performance requirements for different base station classes. These requirements are defined in.

One main difference compared to other base station classes is that the Home base station is owned by a private subscriber, who is at the liberty to install at any location. The operating carrier frequency of the HBS is typically configured by the operator. However the owner of the HBS may have the option to allow or disallow the access of its HBS to the external users. This mechanism is called as the closed subscriber group (CSG). Nonetheless the strict network planning is not possible in case of home base station network. The HNB deployment becomes even more cumbersome from the perspective of interference in environment comprising of large number of HNB subscribers located in large complex or building e.g. 200 HNB housed in 200 closely packed apartments in the same residential complex. This is in contrast with other base station classes, which are deployed by an operator according to some well defined principles. The lack of precise network planning of home base stations may cause interference to other base stations.

Home Base Station Implementation Aspects

A home base station comprises of normal base station functions such as transmitting and receiving signals to and from multiple UE. In addition it could contain a normal receiver circuitry, which is similar to the UE receiver. For simplicity this will be referred to as a HNB measurement unit herein. The purpose of the HNB measurement unit is to perform different types of measurements, which in turn can be used for adjusting its output power level. The measurements are typically done over the signals received from other HBS or non-home BS such as macro/micro/pico BS or relay nodes. Relays are used to improve the coverage of macro/micro/pico base stations in cell coverage borders.

Home Base Station Deployment Scenarios

Mixed Carrier Scenario:

In this scenario the home BS operates on the same frequency channel as that of the surrounding macro network belonging to the operator which deploys the home BS. An operator with a limited spectrum may be obliged to have a mixed carrier deployment scenario if it wishes to offer home base station coverage. The mixed carrier scenario is typically more challenging in terms of co-channel interference between:
Home base stations, and
Home base stations and the non-Home BS e.g. macro network.

The interference situation becomes even worse in UTRAN TDD and Long term evolution (LTE) TDD home BS deployment scenario. This stems from the fact that any difference in uplink and downlink slot or sub-frame configurations in HBS and non-HBS or within different HBS results in severe cross-slot (or cross-sub-frame) interference. Even if the same TDD sub-frame configurations are used in all network nodes, due to the imperfect sub-frame timing due to practical constraints, there will be interference leakage.

Dedicated Carrier Scenario:

In this scenario the home BS operates on a different frequency channel compared to that of the surrounding non-home BS network (e.g. macro network) belonging to the operator which deploys the home BS. This scenario is typically less severe in terms of interference between the home network and the macro network. However, there would still be an impact of adjacent channel interference due to the out of band emissions. This is due to the fact that practical filters used in HBS or any other network nodes or UE cannot completely suppress the emissions outside their operating carrier frequency channel.

Interference Scenarios

Table 1 shows the possible HeNB related interference scenarios, which are mainly reproduced from 3GPP TR 36.922. The listed interference scenarios are applicable for both TDD and FDD deployments. The main difference may exist in how to model the interference since FDD network is typically not synchronized. On the other hand in TDD are network nodes operating over the same carrier frequency should be synchronized.

TABLE 1

Important and Typical Interference Scenarios

| Number | Aggressor | Victim |
|---|---|---|
| 1 | UE attached to Home eNode B | Macro eNode B Uplink |
| 2 | Home eNode B | Macro eNode B Downlink |
| 3 | UE attached to Macro eNode B | Home eNode B Uplink |
| 4 | Macro eNode B | Home eNode B Downlink |
| 5 | UE attached to Home eNode B | Home eNode B Uplink |
| 6 | Home eNode B | Home eNode B Downlink |
| 7 | UE attached to Home eNode B and/or Home eNode B | Other System |
| 8 | Other System | UE attached to Home eNode B and/or Home eNode B |

UE Mobility Measurements

The UE connected to HBS or to any other type of BS (e.g. macro BS) performs the same types of neighbor cell measurements for mobility purposes.

If the UE is served by the HB then it reports the neighbor cell measurements to its serving HBS, which uses them for taking the mobility decisions e.g. for performing handovers.

Similarly if the UE is served by the macro BS then it reports the neighbor cell measurements to its serving macro BS, which in turn uses them for taking the mobility decisions e.g. for performing handovers.

In WCDMA the following three downlink radio measurements are specified primarily for the mobility purpose, see 3GPP TS 25.215, "Physical layer measurements (FDD)".

CPICH RSCP
CPICH Ec/No; CPICH Ec/No=CPICH RSCP/carrier RSSI
UTRA Carrier RSSI

The Received Signal Code Power (RSCP) is measured by the UE on cell level basis on the common pilot channel (CPICH). The UTRA carrier Received signal strength indicator (RSSI), i.e. the total received power and noise from all cells, including serving cells is measured over the entire carrier. The above CPICH measurements are the main quantities used for the mobility decisions.

In E-UTRAN the following downlink radio measurements are specified also primarily for mobility purpose, see 3GPP TS 36.214, "Evolved Universal Terrestrial Radio Access (E UTRA); Physical layer measurements".

:

Reference symbol received power (RSRP)
Reference symbol received quality (RSRQ): RSRQ=RSRP/carrier RSSI The RSRP or RSRP part in RSRQ in E-UTRAN is solely measured by the UE on cell level basis on reference symbols. There is no specific carrier RSSI measurement rather it is part of RSRQ definition.

The neighbour cell measurements are typically averaged over long time period in the order of 200 ms or even longer to filter out the effect of fast fading.

There is also a requirement on the UE to measure and report the neighbour cell measurements (e.g. RSRP and RSRQ in E-UTRAN) from certain minimum number of cells. In both WCDMA and E-UTRAN, see 3GPP TS 25.133, "Requirements for support of radio resource management (FDD)" and 3GPP TS 36.133, "Evolved Universal Terrestrial Radio Access (E UTRA); Requirements for support of radio resource management", this number is 8 cells (comprising of one serving and seven neighbour cells) on the serving carrier frequency (or commonly termed as intra-frequency).

In GSM system the following measurement for mobility is specified.

GSM Carrier RSSI

In cdma2000 1 x RTT system the following quality measurement for mobility is specified; see 3GPP2 CS.0005-D v1.0 "Upper Layer (Layer 3) Signaling Standard for CDMA2000 Spread Spectrum Systems Release D".

.

CDMA2000 1x RTT Pilot Strength

In cdma2000 HRPD system the following quality measurement for mobility is specified, see 3GPP2 CS.0024-A v3.0 "cdma2000 High Rate Packet Data Air Interface Specification".

.

CDMA2000 HRPD Pilot Strength

Maximum Allowed Transmit Power Adjustment

The maximum allowed transmit power of both home BS and UE served by the home BS can be adjusted to minimize interference to other home BS or to other types of base stations such as macro or micro base stations. This will be described below:

Adjustment of Home BS Maximum Transmit Power

Unlike other base station classes, home base stations are owned by the subscriber and will be deployed in homes, flats and other private premises. This means their physical location is not under the control of an operator. As they operate under licensed band, they may cause interference to each other but as well as to the outdoor base stations specifically the macro networks or to other network nodes such as relays. The interference will be worse in case home and outdoor base stations operate on the same carrier frequency. Due to this potential risk of interference, the maximum output power of the home base station should be regulated to minimize the impact on other cell applications e.g. macro. Typically the maximum output power will be varied slowly i.e. in the order of several seconds or even longer.

Adjustment of UE Maximum Transmit Power

For the sake of clarity the following definitions will be used:

HUE is a UE served by a home base station

MUE is a UE served by a radio network node which is not a home base station e.g. MUE is the UE served by macro BS.

In general a UE in terms of its maximum output power capability belongs to a particular UE power class (PC). For instance in WCDMA, there are several UE power classes namely:

PC4=21 dBm
PC3bis=23 dBm
PC3=24 dBm

For instance a WCDMA UE belonging to the PC3, which is the most commonly used power class, can operate at maximum output power equal to 24 dBm.

In LTE, hitherto there exists only one UE power class namely:

PC3=23 dBm

In general existing mechanisms allow the network to configure the UE to the maximum output power level, which is lower than its power class capability. For instance a LTE UE can be configured to a maximum output power of 10 dBm i.e. 13 dBm lower than its nominal value (i.e. power class capability).

This configuration at a lower than the maximum possible output power is typically achieved by using higher signaling such as radio resource control (RRC) signaling.

In existing systems the UE maximum output power is typically lowered in small cells such as in pico or micro network deployment scenarios.

In existing systems the maximum output power of a HUE can also be lowered by the serving home BS.

Home BS Measurements for Maximum Adaptive Power Setting

As stated above a home base station can have a measurement unit for performing measurements over signals received from other HBS and from non-HBS network nodes such as macro BS or relay node. This means that a home base station can in principle perform the same measurements which are performed by a UE. However the terminology used for the measurements done at the HBS may differ with those done by the UE. For instance, the WCDMA HBS measurement, "CPICH Ec", is the equivalent of the WCDMA UE measurement CPICH RSCP. In both cases they can be regarded as signal strength measurements.

These measurements are used by the home base station to adaptively set the maximum transmit power of the home BS and also that of the HUE, i.e. setting of maximum output power as explained elsewhere in this application. For setting the maximum output power of the HUE, the HBS may also use the UE reported measurements (e.g. mobility measurements as explained elsewhere in this application) as well the internal HBS measurements or simply the former measurements.

Depending upon the access technology of the home base station one or more radio measurements specific to that access technology will typically be used by the home base station to adjust its transmit power level. This means in WCDMA that the measurements that can be used by the HBS are similar to the WCDMA UE measurements: CPICH RSCP, CPICH Ec/No and UTRA carrier RSSI.

The cell specific measurements (i.e. equivalent to UE measurements CPICH RSCP or Ec/No in WCDMA) are performed on neighboring base stations, which may be home base stations, macro/mico/pico (i.e. non home base station) or combination thereof. In any case according to the current WCDMA requirements only up to 8 cells can be measured on the intra-frequency carrier or 6 cells on inter-frequency carriers. These measurements need to be combined and processed in an adequate manner to make sure that the adjusted power leads to reduction in interference to the non home base stations. At the same time whenever possible, that is when relatively shielded from the non home base stations, the home base station is able to operate at relatively higher output power so that home base station resources are fully exploited.

The HUE served by HBS may cause uplink interference to other radio network nodes such as non-HBS radio network nodes (e.g. macro BS) or other HBS operating in a carrier frequency, which may be the same or adjacent to that of the HBS serving the HUE. The uplink interference towards these radio network nodes becomes even more severe with the increase in the number of HUEs served by the HBS. The interference problem is further accentuated when there is a large number of HBSs operating in the same area such as in a large complex with several apartments. In the latter case, the cumulative effect of the interference may in particular significantly deteriorate the reception quality of the signal at the other radio network nodes (e.g. macro BS or relay node). This situation is shown in FIG. 1.

In FIG. 1, the HNB and the macro BS may operate in the same carrier frequency or in a different carrier frequency e.g. HNB and Macro BS operate in adjacent carrier frequencies. The HNB and macro BS may belong to the same or different access technologies. For instance both HNB and macro BS can be based on WCDMA. Alternatively HNB and macro BS are based on WCDMA and LTE respectively. In the latter case typically the HNB and LTE don't operate over the same carrier frequency; however they may very well operate in adjacent carrier frequencies. The adjacent carriers and the corresponding network (HBSs or macro BS s) may also belong to different operators.

It is desirable to reduce the interference from the HUE served by HBS towards other radio network nodes such as non-HBS radio network nodes.

Several solutions have been proposed to adaptively set the maximum output power of the HUE so as to minimize the co-channel or neighbor cell interference towards other radio network node e.g. macro BS. The other radio network node may belong to the same or different technologies compared to that of the MUE (and home BS) under consideration.

In existing systems typically the serving HBS uses one or more UE reported mobility measurements such as CPICH RSCP or path loss to lower the maximum output power of the UE below its nominal output power level.

In accordance with another pre-existing solution the HBS measures the signal strength or signal quality from one or more strongest macro base station and determine the UE maximum allowed UE output power. Another solution is to use the total interference received at the HBS as a metric to determine the UE maximum output power.

However, all the above UE and HBS measurements suffer from inadequate accuracy levels. For instance carrier RSSI and CPICH RSCP in WCDMA or RSRP in LTE have very coarse measurement accuracies e.g. ±7-9 dB. The RSRQ in LTE and CPICH Ec/No in WCDMA have relatively better accuracy. But their accuracies also deteriorate at lower SNR levels. Furthermore the use of only CPICH Ec/No or RSRQ for setting the maximum output power is not appropriate due to the fact that the interference component in these measurements does not fully incorporate and depict the overall interference on a carrier. Indeed these measurements are primarily tailored for the mobility purpose.

Another drawback is that these existing solutions don't enable home base station to identify whether HUEs are in the proximity of other radio network nodes such as macro BS. Thus these solutions on the one hand are unable to fully protect the macro network as the HUE serving by the home base stations may be operating at higher output power than desired. One the other hand the maximum output power of the HUE may be conservatively set causing performance loss of the HUE operating in a home base station environment.

Hence the current solutions don't fully ensure the protection of non home base stations especially the macro base stations from the interference generated by the HUEs under the control of home BSs.

SUMMARY

Adaptive power regulation methods for setting the maximum UE power for a UE connected to a home base station are hence required to ensure that on the one hand the macro networks are protected but at the same time the system performance of a home base station is reasonably good.

As has been realized determination of user positioning via a dedicated handheld device or an integrated mobile phone is on the rise. Furthermore, for safety purposes, mobile positioning is gradually becoming mandatory in several parts of the world. For instance, in the US the FCC mandate for Phase II E-911 services (emergency call public safety systems) in the near future will require that all mobile devices support positioning. Thus, in most mobile devices presently support some sort of positioning mechanism.

Several methods are in fact already standardized and could be used for positioning (i.e. for determining mobile user position) in mobile communication. Some well known examples are: satellite based positioning, fingerprinting, time of arrival of signal or time difference of arrival of signals based methods, etc.

Global Navigation Satellite System (GNSS) is the standard generic term for satellite navigation systems that enable subscriber to locate their position and acquire other relevant navigational information.

The global positioning system (GPS) and the European Galileo positioning system are well known examples of GNSS. Other potential systems, which are either proposed or being developed are: Russian GlObal Navigation Satellite System (GLONASS), Chinese COMPASS and Indian Regional Navigational Satellite System (IRNSS).

However, only GPS is currently in operation for more than a decade. The GPS comprises of a constellation of 24 to 32 medium earth orbit (MEO) satellites revolving around the earth. They transmit pilot signals and other broadcast information, which are received and processed by the GPS receivers for determining geographical position. Signals from certain number of satellites (e.g. 5 or more) should be received in order for the GPS receiver to accurately location the geographical position of the user. Of course more number of visible satellites would further enhance the accuracy.

The assisted GPS (A-GPS) or any assistance GNSS (A-GNSS) is tailored to work with a user terminal (UE) and thus enables UE subscribers to relatively accurately determine their location, time, and even velocity (including direction) in open area environment provided sufficient number of satellites are visible. The assistance GPS requires that the serving network node provides assistance data to the UE in order to track the satellites. Hence, for the A-GPS to work the UE should be camped to the cellular network. On the other hand the UE can also implement a conventional standalone GPS receiver, which is used in GPS navigator.

The positioning methods based on fingerprinting enable the location of mobile users with good accuracy in closed or indoor locations such as inside buildings, parking lots, hospitals, etc.

Among various positioning methods, GPS and in particular A-GPS is considered to be one of the most viable and commonly used location methods.

As described earlier the home base station can incorporate a receiver which is similar that of the normal UE receiver. This means it can also implement A-GPS receiver or a standalone GPS receiver or support other possible positioning method. Nevertheless in a legacy network (i.e. comprising of non home base stations) supporting GPS service, the base stations also have a GPS receiver. This is used to provide the assistance data such as some basic GPS related information (e.g. satellites, base station GPS coordinates etc) to the UE. This information assists UE in determining GPS position relatively quickly especially after a cold start e.g. initial access or coming out of a tunnel. This means a home base station is also likely to have an inbuilt A-GPS or GPS receiver.

Thus, in accordance with one embodiment a method in a home base station for adapting the maximum output power of a user equipment served by the home base station is provided. The method comprises determining a Global Navigation Satellite System, GNSS, reception quality, and determining a maximum output power of the User Equipment using the GNSS reception quality.

In accordance with one embodiment the GNSS reception quality is determined in the user equipment, or the GNSS reception quality in the home base station or on a combination of the GNSS reception quality in the user equipment and the GNSS reception quality home base station.

In accordance with one embodiment wherein the maximum output power of the User Equipment is determined also using cellular measurements.

In accordance with one embodiment the cellular measurements are performed in the user equipment or the home base station or both the user equipment and the home base station.

In accordance with one embodiment, if the GNSS reception quality is determined to be above a threshold value, the serving home base station lowers the maximum output power of the user equipment.

In accordance with one embodiment, if the GNSS reception quality is determined to be below a threshold value, the serving home base station increases the maximum output power of the user equipment.

As a result and in accordance with various embodiments described herein GNSS reception quality can be used to determine the maximum output power of a Home UE, i.e. a UE served by home base station and is based on the insight that GNSS reception quality may be used for estimation of the interference caused by transmissions of an HUE on an existing network. The power of the HUE need be restricted to keep interference within limit. The estimation of the interference, and the determination of the HUE maximum output power, is based on the GNSS reception quality in the HUE, or the GNSS reception quality in the HBS or on a combination of the GNSS reception in the HUE and the HBS. In one embodiment a combined metric based on the GNSS reception quality and one or more cellular radio measurement is used to determine the maximum output power of the HUE. The GNSS reception quality measurements and the cellular measurements used for deriving the combined metric can be performed in the HUE and/or in the HBS or in both. Hereby a number of advantages over current systems and methods can be achieved. For example, the interference from the HUE (served by the home BS) to other cellular network e.g. macro network or relay nodes is reduced. The GNSS or A-GNSS receiver in the UE and/or home BS are exploited for setting an appropriate maximum output power of the HUE. The HUE served by the home BS is able to operate at its maximum possible output power level whenever possible without significantly generating interference towards the surrounding network.

The invention also extends to a home base station arranged to maximum output power for a user equipment in accordance with the above methods. The invention further extends to the corresponding methods performed in a user equipment and to a user equipment station arranged to maximum output power for a user equipment in accordance with the above methods. To enable setting of the maximum output power of the user equipment the home base station can be provided with a controller/controller circuitry for performing the above processes. The controller(s)/controller circuitry can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or may include, without limitation, digital signal processor (DSP) hardware, ASIC hardware, read only memory (ROM), random access memory (RAM), and/or other storage media.

BRIEF DESCRIPTION OF THE DRAWINGS

The present invention will now be described in more detail by way of non-limiting examples and with reference to the accompanying drawings, in which.

DETAILED DESCRIPTION

In accordance with embodiments described herein methods in home BS or a UE for dynamically or semi-statically setting the maximum output power of the HUE, which are served by the said home base station. Among others, the following advantages can be obtained:

uplink interference from the HUE towards the non-home BS especially the outdoor networks (e.g. macro base stations) and other HBS (i.e. other than the serving HBS) remain within an acceptable limit; and the HUE served by the home base station is able to operate at its maximum possible output power level while the first objective is not violated. This means the maximum possible potential of the HUE transmit power capability in the home base station environment is exploited. This ensures that HUE uplink performance (i.e. HUE uplink throughput measured at serving HBS) is not unnecessarily deteriorated.

Below different methods to achieve the above objectives are disclosed:

In accordance with one embodiment the Maximum Output Power Setting of HUE based on GNSS detection Performance.

In accordance with another embodiment the Maximum Output Power Setting of HUE based on Combined GNSS detection performance and cellular measurements.

The generic term GNSS (or A-GNSS wherever applicable) will be used for a positioning system. However it should be noted that as a special case, the GNSS can be GPS, which is currently operational.

Figure 1:
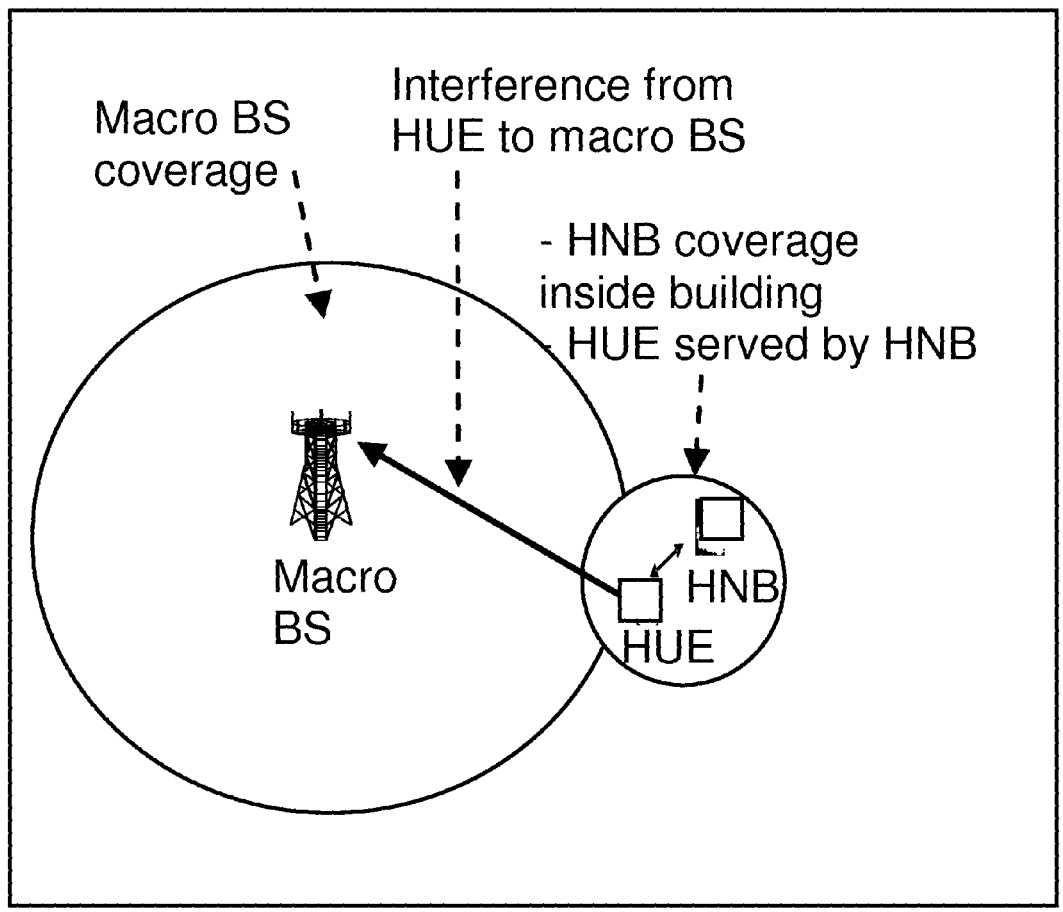
FIG. 1 shows a block diagram illustrating an uplink interference scenario.
Figure 2:
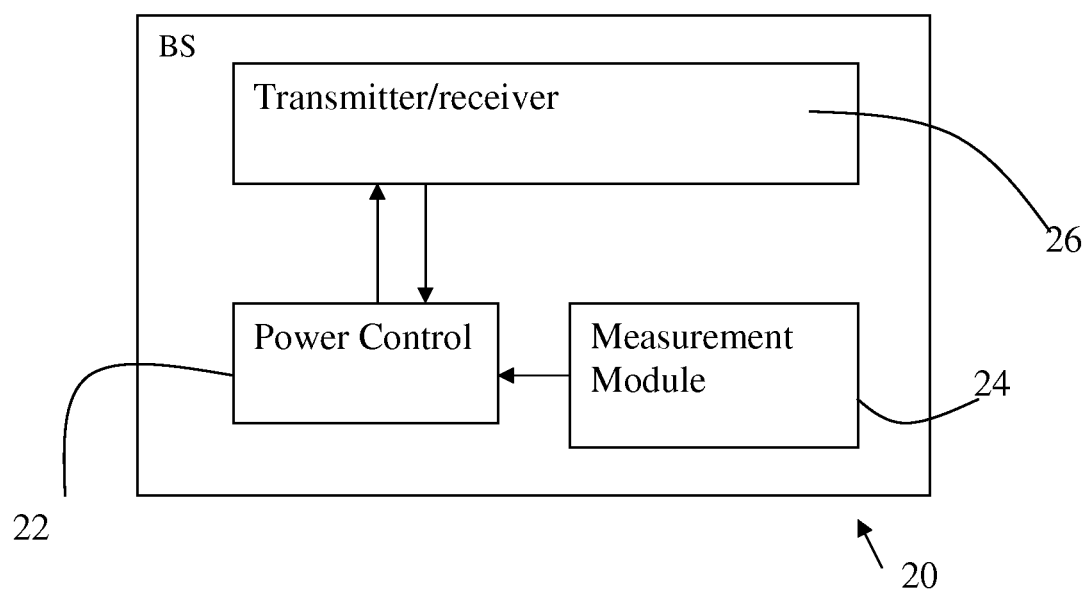
FIG. 2 is a view of a Home base station.

In FIG. 2 a view of a Home base station 20 configured to operate in accordance with such principles is depicted. The home base station 20 can comprise controller circuitry for performing different tasks assigned to the home base station. In particular, and as part of the controller circuitry, the home base station can comprise a controller 22. The controller 22 can in particular be configured to set to power for a UE as described herein. The controller can be connected to a transmitter/receiver unit 26. The transmitter receiver unit can be configured to receive/transmit different data and control signals to a user equipment connected to the home based station over an air-interface. The home base station can also comprise a measurement unit 24. The measurement unit can generate different measures depending on the configuration thereof. For example, the measurement unit can generate a GNSS reception quality measure and may also be configured to generate cell measurements. The measurement unit can also be configured to receive different measurements from other units located outside the home base station. For example the measurement unit 24 can be configured to receive measurements of GNSS reception quality and/or cell measurements from the HUE. When the UE sets the output power directly the corresponding circuitry is provided in the UE.

Figure 4:
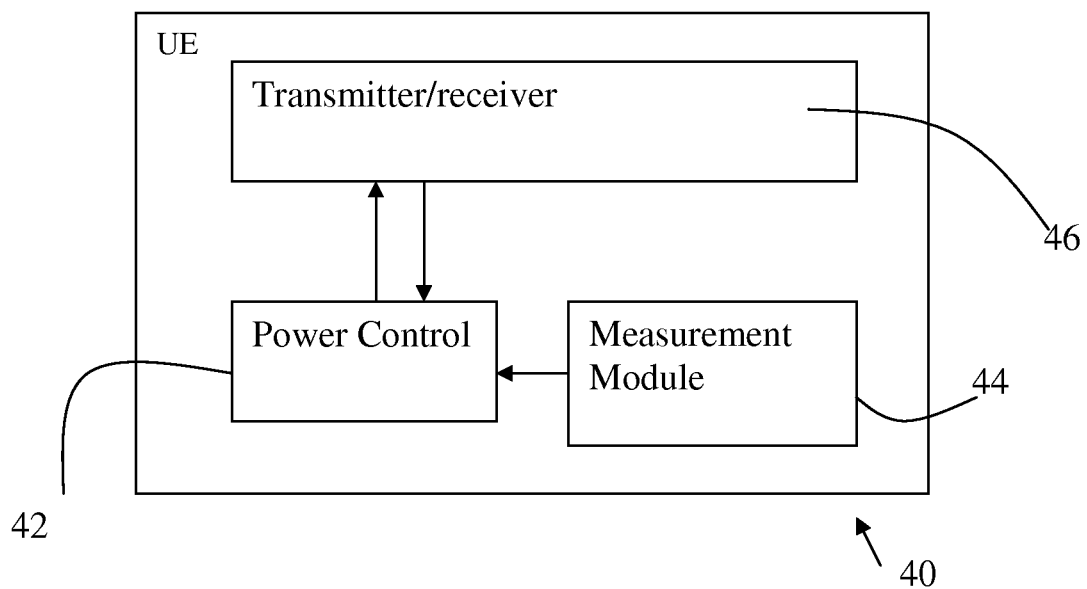
FIG. 4 is a view of a User Equipment.

A UE 40 is depicted in FIG. 4. The UE 40 can comprise controller circuitry for performing different tasks assigned to the UE. In particular, and as part of the controller circuitry, the UE can comprise a controller 42. The controller 42 can in particular be configured to set to power for the UE as described herein. The controller can be connected to a transmitter/receiver unit 46. The transmitter receiver unit can be configured to receive/transmit different data and control signals to a base station over an air-interface. The UE can also comprise a measurement unit 44. The measurement unit can generate different measures depending on the configuration thereof. For example, the measurement unit can generate a GNSS reception quality measure and may also be configured to generate cell measurements. The measurement unit can also be configured to receive different measurements from other units located outside the UE. For example the measurement unit 44 can be configured to receive measurements of GNSS reception quality and/or cell measurements from a base station.

The different units and controllers of the controller circuitry of the home base station/UE can be implemented using dedicated circuitry and processors. Processors can be provided through the use of dedicated hardware as well as hardware capable of executing software. When provided by a processor, the functions may be provided by a single dedicated processor, by a single shared processor, or by a plurality of individual processors, some of which may be shared or distributed. Moreover, a processor or controller may include, without limitation, digital signal processor (DSP) hardware, ASIC hardware, read only memory (ROM), random access memory (RAM), and/or other storage media.

Figure 3:
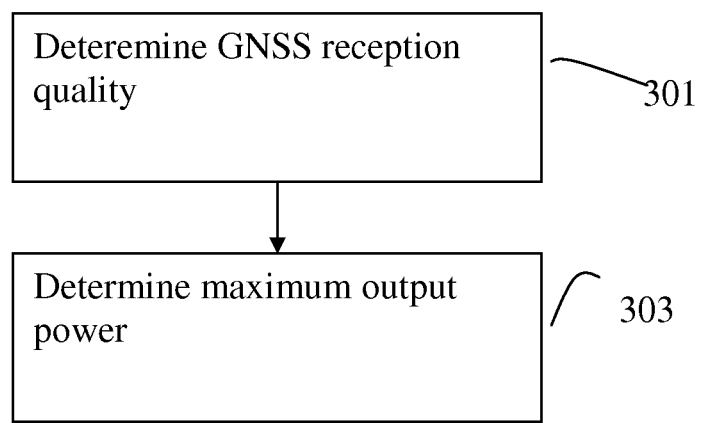
FIG. 3 is a flow chart illustrating some procedural steps performed when controlling the output power in a user equipment.

In FIG. 3 a flow chart illustrating some procedural steps performed when controlling the output power in a user equipment is depicted. Thus, in a method of adapting the maximum output power of a User Equipment served by a home base station, the home base station or user equipment can first in a step 301 determine a GNSS reception quality. Next, in a step 303 a maximum output power of the User Equipment using the GNSS reception quality is determined. The maximum output power to be used by the UE for transmission in the uplink can then be transmitted to the UE which using any suitable method and the UE can in turn be configured to apply the maximum output power set by the home base station or the output power can be set directly by the user equipment.

Below some more detailed examples illustrating various ways of implementing control of the maximum output power to be used in the uplink are given.

Maximum Output Power Setting of HUE Based on GNSS Detection Performance

According to this embodiment the GNSS reception quality in the coverage area of the HBS is used to determine whether the HUE is sufficiently exposed to an external network (e.g. macro BS) or not. Accordingly the maximum output power of HUE is set by its serving HBS. For instance if the GNSS reception quality is strong, above a threshold value, the serving HBS will configure the HUE to lower its maximum output power. On the other hand if the GNSS reception quality in the coverage of the HBS is poor, below a threshold value, the HBS may allow its HUE to operate with relatively higher maximum output power. In the latter case the uplink throughput of the HUE is not unnecessarily degraded.

The GNSS reception quality can be determined by the HUE, HBS or both. Hence this gives rise to three different cases:

GNSS quality detection in HUE
GNSS quality detection in HBS
Combined GNSS quality detection The principle to map or derive HUE maximum output power from the GNSS reception quality is described below. The same principle is used regardless whether GNSS reception quality is determined by the HUE or HBS or by both.

GNSS Quality Detection in HUE

In this embodiment the HUE is requested by its serving HBS to report the GNSS reception quality e.g. number of detected GNSS satellites and/or their quality etc. The reported GNSS quality is then used by its serving HBS to set the maximum output power of the HUE. The HUE may use GNSS or A-GNSS receiver to determine the quality. The reporting of certain GNSS/A-GNSS measurements (e.g. time of arrival of GNSS signals, number of detected satellites etc) by the UE to the network is known in prior art in which the reported GNSS measurements are used by the network for determining the user location. In this embodiment the objective is to use the UE reported GNSS measurements (e.g. number of detected satellites, GNSS reception quality—reporting of the latter GNSS measurement is not known in prior art) for determining the HUE maximum output power in HBS environment. Another possibility is that HUE determines its maximum output power based on the GNSS/A-GNSS reception quality (using the pre-defined mapping tables (see below in conjunction with description of Derivation of Max HUE output power from GNSS quality) for mapping GNSS quality to max output power) and sets the maximum output power either:

autonomously and if necessary also signals the determined value to the network (i.e. serving HBS) for information, or signals the determined value to the network (i.e. serving HBS) as a recommended value, and the serving HBS then eventually configures the HUE with the maximum output power.

In either of the two above alternatives an objective is to ensure that the interference from HUE towards other network nodes e.g. macro BS, relay nodes or other HBS remains within an acceptable limit.

An advantage is that different maximum output power can be set for the different HUEs served by the same HBS.

GNSS Quality Detection in HBS

In this embodiment the GNSS reception quality is determined by the HBS itself. The determined quality is then used by the HBS to set the maximum output power of its HUE. In this embodiment the HBS assumes that all its HUEs have similar GNSS coverage as that of own. Hence in this solution the same maximum output power is set for all HUE served by the same HBS.

Combined GNSS Quality Detection

In the combined scheme the GNSS reception quality determined by both HUE and HBS are used by the serving HBS to set the maximum output power of its HUE. The composite or combined GNSS quality can be determined by using a suitable mathematical operation. For instance one of the following three rules can be used to determine the HUE maximum output power:

Maximum output power based on the average of GNSS reception qualities measured at HBS and HUE. This is a suitable compromise from the standpoints of both HBS and macro network performance.

Maximum output power based on worst of the GNSS reception qualities measured at HBS and HUE. This is a conservative approach from HUE performance point of view but favorable from the point of view of the macro network.

Maximum output power based on the best of the GNSS reception qualities measured at HBS and HUE. This is an aggressive approach from HUE performance point of view but pessimistic from the point of view of the macro network.

Derivation of Max HUE Output Power from GNSS Quality

Methods to derive the HUE maximum output power from the determined GNSS (or A-GNSS) reception quality is described in this section. The GNSS (or A-GNSS) reception quality is determined by ether HUE or HBS or both as described herein.

According to such a method the GNSS or A-GNSS receiver (e.g. GPS receiver as a special case) is used to set the maximum output power. Two aspects of the GNSS receiver can be exploited. First is the number of detected satellites ($N_S$) and second is the reception quality ($Q_R$) of the detected satellites. In accordance with one embodiment at least 4-5 satellites should be visible with sufficient quality to obtain good accuracy of the geographical location. Furthermore, the reception quality can be an aggregate value of all the detected satellites e.g. weighted average of all detected satellites or certain number of strongest satellites. All together ($N_S$ and/or $Q_R$) is referred to as GNSS detection performance for simplicity. Then depending upon the GNSS detection performance the HUE maximum output power is set. The mapping function $F(.)$, which maps the GNSS detection performance to the maximum output power of the HUE ($P_{max\_HUE}$) can use either $N_S$ or $Q_R$ or combination thereof as expressed in (1), (2) and (3):

$$F(\alpha_1 N_S) \rightarrow P_{max\_HUE} \quad (1)$$

$$F(\alpha_2 Q_R) \rightarrow P_{max\_HUE} \quad (2)$$

$$F(\alpha_1 N_S, \alpha_2 Q_R) \rightarrow P_{max\_HUE} \quad (3)$$

Where: $\alpha_1$ and $\alpha_2$ are the weighted factors. Any suitable mapping function such as weighted sum or average can be used.

The above mapping functions are used to create lookup tables to generate the maximum output power based on $N_S$ or $Q_R$ or combination thereof.

Poor GNSS detection performance would correspond to the scenario whereby the HUE served by home base station is considerably shielded from outside base stations (e.g. macro network). Hence the macro network may be inherently protected from the interference originating from the HUE. For instance the HUE could be located in the basement and in that case would not significantly affect the outdoor base stations (e.g. macro or micro base stations or relay node). Therefore higher maximum output power could be used. On the other hand good GNSS detection performance would mean that the location of the HUE could potentially cause significant interference to the outdoor base stations unless the maximum output power of the HUE is reduced to a certain acceptable level.

The above description is focused on a GNSS receiver since this is the only GNSS in operation as of today. However, the idea is applicable to a home base station and HUE, which have any GNSS receiver. For instance this can apply to future envisioned systems e.g. GLONASS, Galileo positioning system, COMPASS, IRNSS etc.

Two Maximum Power Levels

In accordance with one embodiment only two levels of maximum output power are used: lower maximum ($P_{max\_HUE\_low}$) and higher maximum ($P_{max\_HUE\_high}$) output power levels. This means the mapping functions in (1), (2) and (3) will be used to generate lookup tables with two maximum power levels, which in turn are used for setting the maximum output power of the HUE. The maximum level would typically correspond to the maximum nominal output power e.g. 23 dBm for the LTE UE power class 3.

If one or both of the above quantities ($N_S$ and/or $Q_R$) are above predefined thresholds then lower maximum output power for the HUE can be set. Otherwise higher maximum output power can be set. This will ensure the protection of macro network i.e. reduced uplink interference from the HUE.

In another embodiment, which is the opposite case, if one or both of the above quantities ($N_S$ and/or $Q_R$) are above predefined thresholds then higher maximum output power for the HUE is set. Otherwise lower maximum output power is set. This will ensure good performance of the HUE.

In both the above embodiments, the maximum output power of the HUE is dynamically adjusted based on the GNSS detection performance.

Multiple Maximum Power Levels

In accordance with one embodiment several levels (N, N being a positive integer) of maximum output power are used for the HUE. Each level is mapped to the predefined GNSS detection performance levels i.e. certain predefined GNSS reception quality levels and/or number of detected GNSS satellites. This means the mapping functions in (1), (2) and (3) will be used to generate lookup tables with N maximum power levels, which in turn are used for setting the maximum output power of the HUE, which are served by the home base station. Thus depending upon the GNSS performance the maximum output power of the HUE is set with finer granularity leading to better accuracy.

Maximum Output Power Setting of HUE Based on Combined GNSS Detection and Cellular Measurements According one embodiment the maximum output power of HUE is set by using GNSS (or A-GNSS) reception quality and at least one cellular radio measurement.

A suitable combined metric, which is a function of both GNSS reception quality and at least one cellular radio measurement, can be used to determine the HUE maximum output power. For instance the combined metric can be the weighted average of the GNSS reception quality and cellular measurement. The value of the combined metric can be mapped to a certain HUE maximum output power by using a pre-defined mapping table.

The cellular radio measurements can be performed either in the home BS or in HUE or in both. In one embodiment at least one HUE radio measurement (i.e. measured by the HUE) is used in combination with the GNSS reception quality to set the HUE maximum output power.

Similarly the GNSS reception quality measurements can be performed either in the home BS or in HUE or in both. In the preferred embodiment the GNSS reception quality is to be measurement by the HUE for determining the combined metric (i.e. based on GNSS reception quality and cellular radio measurement), which in turn is used to set the HUE maximum output power.

For all the embodiments described herein the measurements, such as GNSS reception quality measurements and cellular radio measurements, performed in the UE can be signaled to the home base station which receives the measurements and uses them for setting the maximum output power of the UE.

Examples of radio measurements that can be performed by the HUE are path loss, CPICH RSCP, CPICH Ec/No in WCDMA or RSRP/RSRQ in LTE as explained above (UE mobility measurements). Examples of radio measurements done by the home BS are path loss, signal strength or signal quality as explained above (home BS measurements).

In accordance with another embodiment the GNSS reception quality and cellular radio measurements can be used as follows:

In accordance with one embodiment the GNSS reception quality can be used to first determine whether the HUE is closer to the macro base station(s) or not. Then any of the cellular radio measurement can be used to more accurately determine the maximum output power of the HUE. This is further explained with examples below.

In accordance with one embodiment both the GNSS reception quality and at least one cellular measurement is used to determine whether HUE will cause interference towards the macro network or towards neighboring home base stations. This is termed a combined scheme herein since GNSS quality and cellular measurements are used for the determination. Furthermore the combined measurements may also be used to set the maximum output power of the HUE as described further below. The cellular radio measurements can be performed either in the home BS or in HUE or in both. In one embodiment at least one HUE radio measurement (i.e. measured by the HUE) is used in combination with the GNSS reception quality to set the HUE maximum output power. The GNSS reception quality can be used to identify whether the HUE may potentially interfere with the macro network. Then in addition at least one cellular radio measurement is performed to check if there is macro network coverage in the vicinity of the HUE. For instance, if the macro network coverage of the cellular radio network (e.g. signal strength or signal quality) is poor, under a threshold value as well as the GNSS reception quality is below a threshold, then the home BS can set higher maximum output power of the HUE. On the other hand if both cellular measurement quality (e.g. signal strength) and GNSS reception quality are above the corresponding thresholds then the home BS will lower the maximum output power of the HUE. In case the GNSS reception quality is above the threshold but the cellular measurement quality (e.g. signal strength) is below the threshold then the home BS can set a higher, increased, output power of the HUE. Therefore the combined scheme for determining the HUE maximum output power based on at least one cellular measurement and the GNSS reception quality is particularly advantageous in scenario where there is no or sparse coverage of the macro or micro network. For instance in this scenario the HUE may report very good GNSS reception quality e.g. assuming it is located in the balcony or garden of the home. At the same time the HUE will report very low quality of the measurement (e.g. signal strength) done on a cellular radio network nodes (e.g. macro base station on adjacent carrier and co-channel). Hence due to the lack of the macro network coverage as confirmed by the HUE reported measurement, the home BS can still set a relatively high HUE maximum output power. A suitable combined metric, which is a function of both GNSS reception quality and at least one cellular radio measurement, can be used to determine the HUE maximum output power. For instance the combined metric can be the weighted average of the GNSS reception quality and cellular measurement. The value of the combined metric can be mapped to a certain HUE maximum output power by using a pre-defined mapping table.

Examples of the mapping function G(.), which maps the GNSS detection performance and the cellular measurement to the maximum output power of the HUE ($P_{max\_HUE}$). The mapping functions can use one or more GNSS quality measures (i.e. either $N_S$ or $Q_R$ or combination thereof) and one or more cellular measurement ($S_x$) as expressed in (4), (5) and (6):

$$G(\alpha_1 N_S, \beta_1 S_1, \beta_2 S_2, \ldots, \beta_L S_L) \rightarrow P_{max\_HUE} \quad (4)$$

$$G(\alpha_2 Q_R, \beta_1 S_1, \beta_2 S_2, \ldots, \beta_L S_L) \rightarrow P_{max\_HUE} \quad (5)$$

$$G(\alpha_1 N_S, \alpha_2 Q_R, \beta_1 S_1, \beta_2 S_2, \ldots, \beta_L S_L) \rightarrow P_{max\_HUE} \quad (6)$$

Where: $S_1, S_2, \ldots, S_L$ are the cellular measurements and $\beta_1, \beta_2, \ldots, \beta_L$ are their respective weighted factors. Any suitable mapping function such as weighted sum or average can be used to determine the maximum output power of the home BS.

The HUE maximum output power based on the combined metric can either be set autonomously by the HUE or it can be configured by the home BS. In the former case the HUE may signal the value of the autonomously configured power to the home BS.

Embodiments of this invention enjoy a number of advantages over current systems and methods. For example, the interference from the HUE (served by the home BS) to other cellular network e.g. macro network or relay nodes is reduced. The GNSS or A-GNSS receiver in the UE and/or home BS are exploited for setting an appropriate maximum output power of the HUE. The HUE served by the home BS is able to operate at its maximum possible output power level whenever possible without significantly generating interference towards the surrounding network.

The invention claimed is:

1. A method of adapting the maximum output power of a user equipment served by a home base station, the method comprising performing in the home base station:
   determining a Global Navigation Satellite System (GNSS) reception quality;
   determining a maximum output power of the user equipment based on the GNSS reception quality, such that the maximum output power of the user equipment is determined to have a lower value when the GNSS reception quality is stronger than when the GNSS reception quality is poorer, the determining of the maximum output power comprising:
      decreasing the maximum output power responsive to the GNSS reception quality being above a threshold; and
      increasing the maximum output power responsive to the GNSS reception quality being below the threshold; and
   transmitting an indication of the determined maximum output power to the user equipment.

2. The method according to claim 1, wherein determining the GNSS reception quality comprises obtaining the GNSS reception quality from the user equipment, determining the GNSS reception quality in the home base station, or a combination of obtaining the GNSS reception quality from the user equipment and determining the GNSS reception quality in the home base station.

3. The method according to claim 1, wherein said determining the maximum output power of the user equipment is further based on cellular measurements.

4. The method according to claim 3, wherein the cellular measurements are performed in the user equipment, in the home base station, or in both the user equipment and the home base station.

5. The method according to claim 1, wherein a function of both GNSS reception quality and at least one cellular radio measurement is used to determine the maximum output power of the user equipment.

6. A home base station configured to adapt the maximum output power of a user equipment served by the home base station, the home base station comprising:
   controller circuitry configured to determine a Global Navigation Satellite System (GNSS) reception quality;
   controller circuitry configured to determine a maximum output power of the user equipment based on the GNSS reception quality, such that the maximum output power of the user equipment is determined to have a lower value when the GNSS reception quality is stronger than when the GNSS reception quality is poorer, the determining of the maximum output power comprising:
      decreasing the maximum output power responsive to the GNSS reception quality being above a threshold; and
      increasing the maximum output power responsive to the GNSS reception quality being below the threshold; and
   a transmitter configured to transmit an indication of the determined maximum output power to the user equipment.

7. The home base station according to claim 6, the home base station being configured to determine the GNSS reception quality based on obtaining the GNSS reception quality received from the user equipment, determining the GNSS reception quality in the home base station, or a combination of obtaining the GNSS reception quality from the user equipment and determining the GNSS reception quality in the home base station.

8. The home base station according to claim 6, wherein the home base station is further configured to determine the maximum output power of the user equipment based on also using cellular measurements.

9. The home base station according to claim 8, wherein the home base station is configured to receive cellular measurements from the user equipment, from the home base station, or from both the user equipment and the home base station.

10. The home base station according to claim 6, wherein the home base station is configured to determine the maximum output power of the user equipment based on a function of both GNSS reception quality and at least one cellular radio measurement.

11. A method of adapting the maximum output power of a user equipment served by a home base station, the method comprising performing the following in the user equipment:
   determining a Global Navigation Satellite System (GNSS) reception quality;
   determining a maximum output power of the user equipment using the GNSS reception quality, such that the maximum output power of the user equipment is determined to have a lower value when the GNSS reception quality is stronger than when the GNSS reception quality is poorer, the determining of the maximum output power comprising:
      decreasing the maximum output power responsive to the GNSS reception quality being above a threshold; and
      increasing the maximum output power responsive to the GNSS reception quality being below the threshold; and
   either transmitting an indication of the determined maximum output power to the base station or performing power control based on the determined maximum output power.

12. The method according to claim 11, wherein determining the GNSS reception quality comprises determining the GNSS reception quality in the user equipment, obtaining the GNSS reception quality from the home base station, or a combination of determining the GNSS reception quality in the user equipment and obtaining the GNSS reception quality from the home base station.

13. The method according to claim 11, wherein said determining the maximum output power of the user equipment is further based on cellular measurements.

14. The method according to claim 13, wherein the cellular measurements are performed in the user equipment, in the home base station, or in both the user equipment and the home base station.

15. The method according to claim 11, wherein a function of both GNSS reception quality and at least one cellular radio measurement is used to determine the maximum output power of the user equipment.

16. A user equipment configured to adapt the maximum output power of the user equipment, the user equipment being connectable to a home base station, the user equipment comprising:
   controller circuitry configured to determine a Global Navigation Satellite System (GNSS) reception quality; and
   controller circuitry configured to determine a maximum output power of the user equipment using the GNSS reception quality, such that the maximum output power of the user equipment is determined to have a lower value when the GNSS reception quality is stronger than when the GNSS reception quality is poorer, the determining of the maximum output power comprising:
      decreasing the maximum output power responsive to the GNSS reception quality being above a threshold; and
      increasing the maximum output power responsive to the GNSS reception quality being below the threshold;
   wherein the user equipment is configured to either transmit an indication of the maximum output power to the base station or to perform power control based on the determined maximum output power.

17. The user equipment according to claim 16, the user equipment being configured to determine the GNSS reception quality based on obtaining the GNSS reception quality from the home base station, determining the GNSS reception quality in the user equipment, or a combination of determining the GNSS reception quality in the user equipment and obtaining the GNSS reception quality from the home base station.

18. The user equipment according to claim 16, wherein the user equipment is further configured to determine the maximum output power based on cellular measurements.

19. The user equipment according to claim 18, wherein the user equipment is configured to receive cellular measurements from the home base station.

20. The user equipment according to claim 16, wherein the user equipment is configured to determine the maximum output power of the user equipment based on a function of both GNSS reception quality and at least one cellular radio measurement.

21. A method of adapting the maximum output power of a user equipment served by a home base station, the method comprising performing in the home base station:
   determining a Global Navigation Satellite System (GNSS) reception quality;
   determining a maximum output power of the user equipment based on the GNSS reception quality, such that the maximum output power of the user equipment is determined to have a lower value when the GNSS reception quality is stronger than when the GNSS reception quality is poorer, the determining of the maximum output power comprising:
      decreasing the maximum output power responsive to the GNSS reception quality being above a first threshold and a cellular measurement quality being above a second threshold;
      increasing the maximum output power responsive to the GNSS reception quality being above the first threshold and the cellular measurement quality being below the second threshold; and
      increasing the maximum output power responsive to the GNSS reception quality being below the first threshold and the cellular measurement quality being below the second threshold; and
   transmitting an indication of the maximum output power to the user equipment.

22. A home base station configured to adapt the maximum output power of a user equipment served by the home base station, the home base station comprising:
   controller circuitry configured to determine a Global Navigation Satellite System (GNSS) reception quality;
   controller circuitry configured to determine a maximum output power of the user equipment using the GNSS reception quality, such that the maximum output power of the user equipment is determined to have a lower value when the GNSS reception quality is stronger than when the GNSS reception quality is poorer, the determining of the maximum output power comprising:
      decreasing the maximum output power responsive to the GNSS reception quality being above a first threshold and a cellular measurement quality being above a second threshold;
      increasing the maximum output power responsive to the GNSS reception quality being above the first threshold and the cellular measurement quality being below the second threshold; and
      increasing the maximum output power responsive to the GNSS reception quality being below the first threshold and the cellular measurement quality being below the second threshold; and
   a transmitter configured to transmit an indication of the maximum output power to the user equipment.

23. A method of adapting the maximum output power of a user equipment served by a home base station, the method comprising performing the following in the user equipment:

determining a Global Navigation Satellite System (GNSS) reception quality; and determining a maximum output power of the user equipment using the GNSS reception quality, such that the maximum output power of the user equipment is determined to have a lower value when the GNSS reception quality is stronger than when the GNSS reception quality is poorer, the determining of the maximum output power comprising:

decreasing the maximum output power responsive to the GNSS reception quality being above a first threshold and a cellular measurement quality being above a second threshold;

increasing the maximum output power responsive to the GNSS reception quality being above the first threshold and the cellular measurement quality being below the second threshold; and increasing the maximum output power responsive to the GNSS reception quality being below the first threshold and the cellular measurement quality being below the second threshold; and either transmitting an indication of the maximum output power to the base station or performing power control based on the determined maximum output power.

24. A user equipment configured to adapt the maximum output power of the user equipment, the user equipment being connectable to a home base station, the user equipment comprising:

controller circuitry configured to determine a Global Navigation Satellite System (GNSS) reception quality; and controller circuitry configured to determine a maximum output power of the user equipment using the GNSS reception quality, such that the maximum output power of the user equipment is determined to have a lower value when the GNSS reception quality is stronger than when the GNSS reception quality is poorer, the determining of the maximum output power comprising:

decreasing the maximum output power responsive to the GNSS reception quality being above a first threshold and a cellular measurement quality being above a second threshold;

increasing the maximum output power responsive to the GNSS reception quality being above the first threshold and the cellular measurement quality being below the second threshold; and increasing the maximum output power responsive to the GNSS reception quality being below the first threshold and the cellular measurement quality being below the second threshold; and wherein the user equipment is configured to either transmit an indication of the maximum output power to the base station or to perform power control based on the determined maximum output power.

\* \* \* \* \*